(12) United States Patent
Brenes

(10) Patent No.: US 6,443,426 B1
(45) Date of Patent: Sep. 3, 2002

(54) SLIDE LOCK FOR VACUUM VALVE

(75) Inventor: Arthur Brenes, 5855 Jensen Rd., Castro Valley, CA (US) 94546

(73) Assignee: Arthur Brenes, Castro Valley, CA (US)

( * ) Notice: Subject to any disclaimer, the term of this patent is extended or adjusted under 35 U.S.C. 154(b) by 0 days.

(21) Appl. No.: 09/610,708

(22) Filed: Jul. 7, 2000

Related U.S. Application Data

(60) Provisional application No. 60/143,141, filed on Jul. 7, 1999.

(51) Int. Cl.[7] .............................................. F16K 51/02
(52) U.S. Cl. ...................... 251/291; 251/329; 74/109; 403/321
(58) Field of Search ................................ 251/291, 329, 251/326; 403/321; 74/109

(56) References Cited

U.S. PATENT DOCUMENTS

| | | | |
|---|---|---|---|
| 1,626,197 A | * 4/1927 | Hutton | 74/109 |
| 4,137,937 A | * 2/1979 | Reedy | 251/291 X |
| 4,440,381 A | * 4/1984 | Tipton, Jr. | 251/329 X |
| 4,917,143 A | * 4/1990 | Grooms | 251/367 X |
| 5,253,917 A | * 10/1993 | Breuggemann | 74/109 X |
| 5,431,509 A | * 7/1995 | Anderson et al. | 403/331 X |
| 5,597,184 A | * 1/1997 | Brenes et al. | 285/24 |
| 5,706,852 A | * 1/1998 | DeVille | 251/329 X |
| 5,791,632 A | 8/1998 | Brenes | |
| 5,884,899 A | 3/1999 | Brenes | |
| 6,007,047 A | * 12/1999 | Phipps | 251/291 X |

* cited by examiner

Primary Examiner—James Hook
Assistant Examiner—John Bastianelli
(74) Attorney, Agent, or Firm—Dorsey & Whitney LLP

(57) ABSTRACT

An improved slide lock mechanism for a vacuum valve (10) including an end plate or bonnet (42) mounted to an end flange (46) and a pair of slide lock plates (14). An elongated drive shaft pinion (36) drives a rack (52) connected to slide lock plates (14), to linearly shift the slide lock plates into clamping engagement with guide screws (20), thus achieving a tight seal at upper flange (46) and bonnet (42). Elongated drive shaft pinion (36) provides access from above vacuum valve for disengaging, or unclamping, the valve plate and its actuator for repair or maintenance.

19 Claims, 5 Drawing Sheets

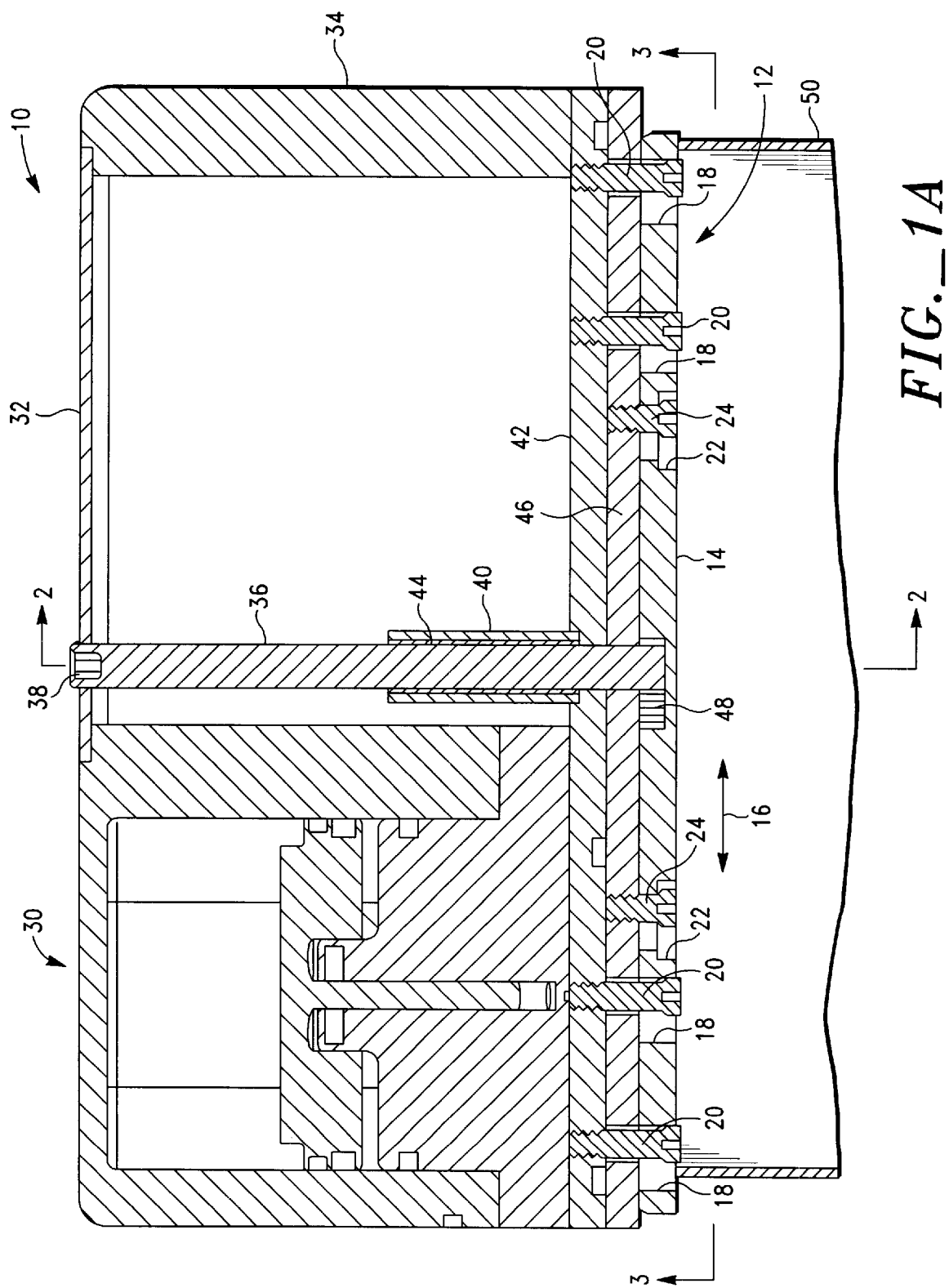
FIG._1A

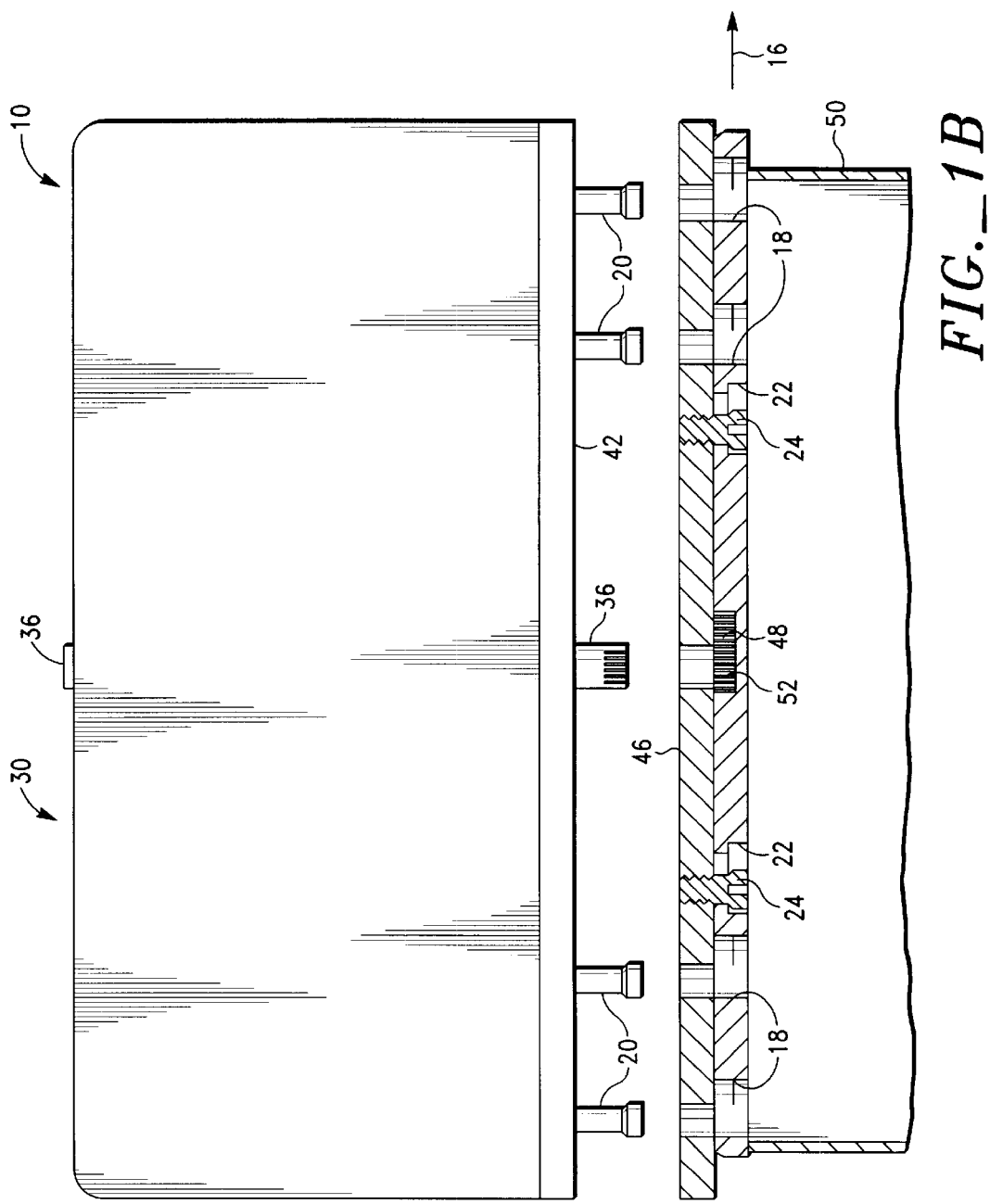

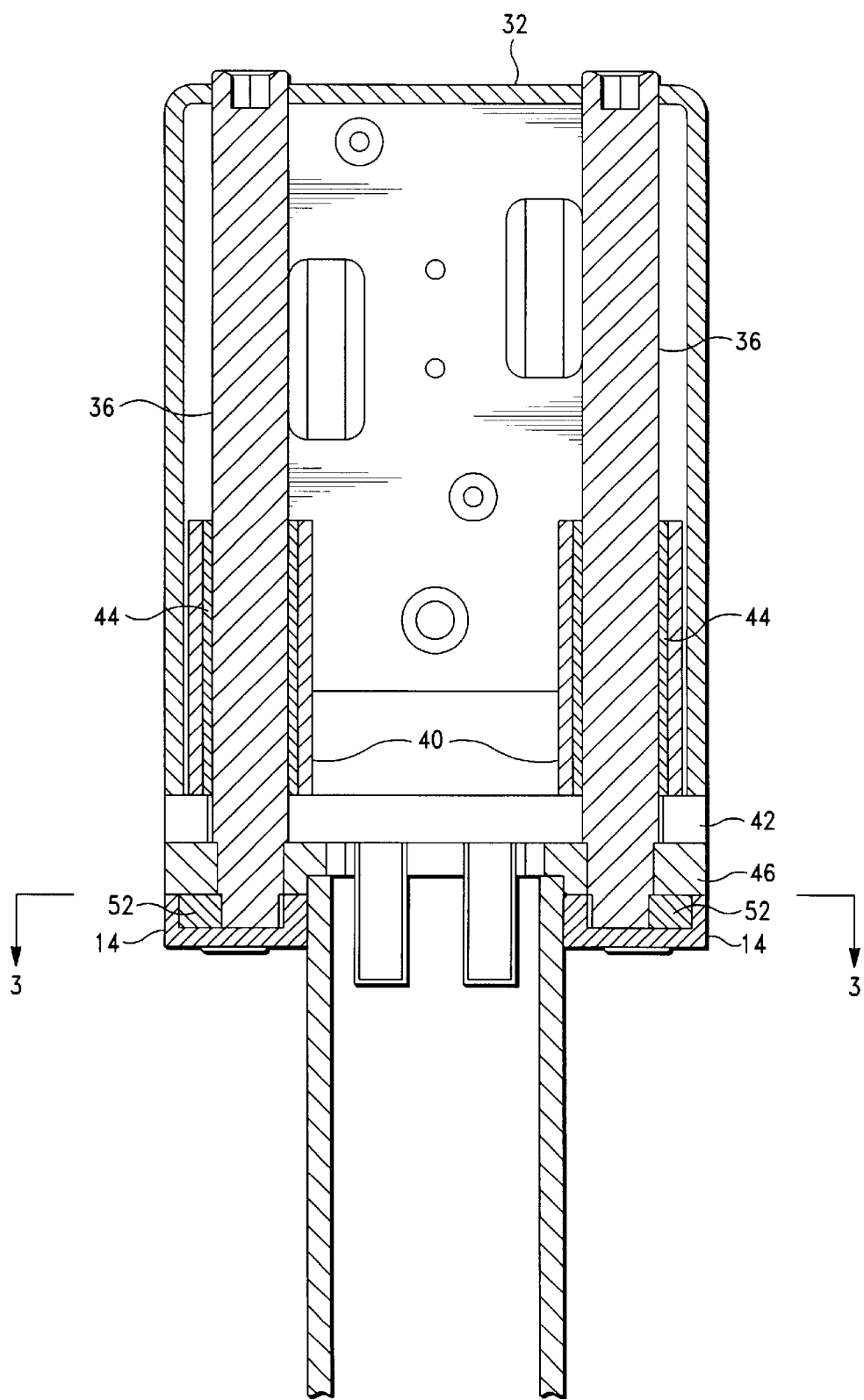
FIG._2

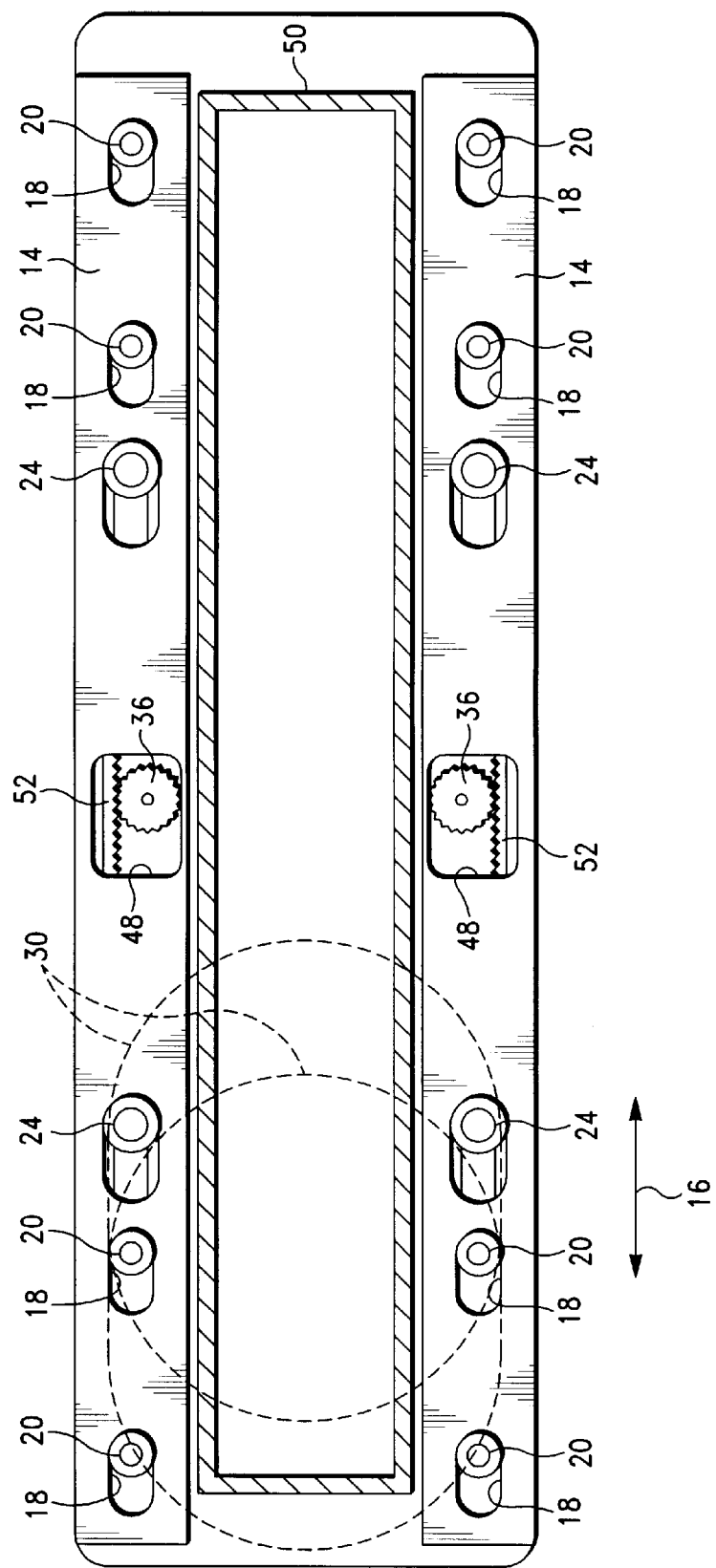
FIG._3

SLIDE LOCK FOR VACUUM VALVE

RELATED APPLICATION

This application claims priority on U.S. Provisional Application 60/143,141, filed Jul. 7, 1999.

FIELD OF THE INVENTION

The present invention pertains to vacuum valves for applied processing systems and, more particularly, to an improved quick release clamp mechanism for connecting and disconnecting the bonnet and flange of gate valves.

BACKGROUND OF THE INVENTION

My U.S. Pat. No. 5,791,632, entitled "Quick Release Slide Lock for Vacuum Valve," discloses a quick release clamp mechanism for releasing or disengaging the bonnet of the gate valve actuator from the valve body flange associated therewith. The disclosure of this reference is incorporated herein. While the quick release mechanism disclosed in this patent provides an efficient quick release and a tight seal for operation, the drive of the computer chip manufacturing industry to smaller and smaller processing systems makes servicing and performing routine maintenance of such systems more difficult. The present invention addresses these difficulties with an improved quick release mechanism that better takes advantage of limited, yet available, space.

DISCLOSURE OF INVENTION

Briefly described, the improved vacuum valve of the present invention comprises a clamp actuator that extends through the end plate of a valve housing that defines a valve chamber and includes a main opening. The clamp actuator extends from above the end plate and is connected to a clamp mechanism of the valve for moving the clamp mechanism between its first position and its second position. A valve plate is provided that is movable within the valve chamber from a first, open position away from the main opening to a second, closed position wherein the valve plate closes the main opening to prevent vacuum media flow, and a valve plate actuator moves the valve plate between its open and closed positions. The valve plate actuator and valve plate are secured to the end plate so that removal of the end plate in an upward direction separates the valve plate actuator and valve plate from the actuator end of the valve housing. The valve housing also includes an end plate engaging member. Further, the clamp mechanism is coupled to one of the end plate and end plate engaging member, with the clamp mechanism having a first position allowing separation of the end plate from the end plate engaging member and a second position that securely holds the end plate to the end plate engaging member in a sealed manner.

In this manner, access is provided from the actuator end of the vacuum valve, or at least from the outer side of the valve actuator, which allows for more compact design of the vacuum valve, while at the same time providing easy access for repair and maintenance purposes.

According to an aspect of the invention, the clamp actuator includes a pinion component and the clamp mechanism includes a rack component coupled to the pinion component, whereby rotation of the pinion component causes linear movement of the rack component, causing the clamp mechanism to move between its first and second positions. Preferably, the clamp actuator includes an elongated drive shaft connected to the pinion component, the elongated drive shaft extending away from the end plate beyond an outer end of the valve plate actuator, to provide access from above the end plate for service.

According to another aspect of the invention, the drive shaft includes an outer end that has a drive coupling for manual rotation of the drive shaft and connected pinion component, in order to shift the clamp mechanism.

These and other features, advantages and objects of the invention will become apparent from the following description of the best mode for carrying out the invention, when read in conjunction with the accompanying drawings, and the claims, which are all incorporated herein as part of the disclosure of the invention.

BRIEF DESCRIPTION OF THE DRAWINGS

In the drawings, like reference numerals refer to like parts throughout the several views, wherein FIG. 1A is a longitudinal sectional view of the actuator assembly of the upper region of the valve body, showing the bonnet and flange connection and the improved quick release mechanism for separating the two;

FIG. 1B is a side elevation view of the actuator housing of FIG. 1A, with the valve housing shown in section;

FIG. 2 is cross-section view of the components of FIG. 1A; and

FIG. 3 is a horizontal section view of the clamp plates and quick release clamp mechanism.

DETAILED DESCRIPTION OF THE INVENTION

Figure 1C:
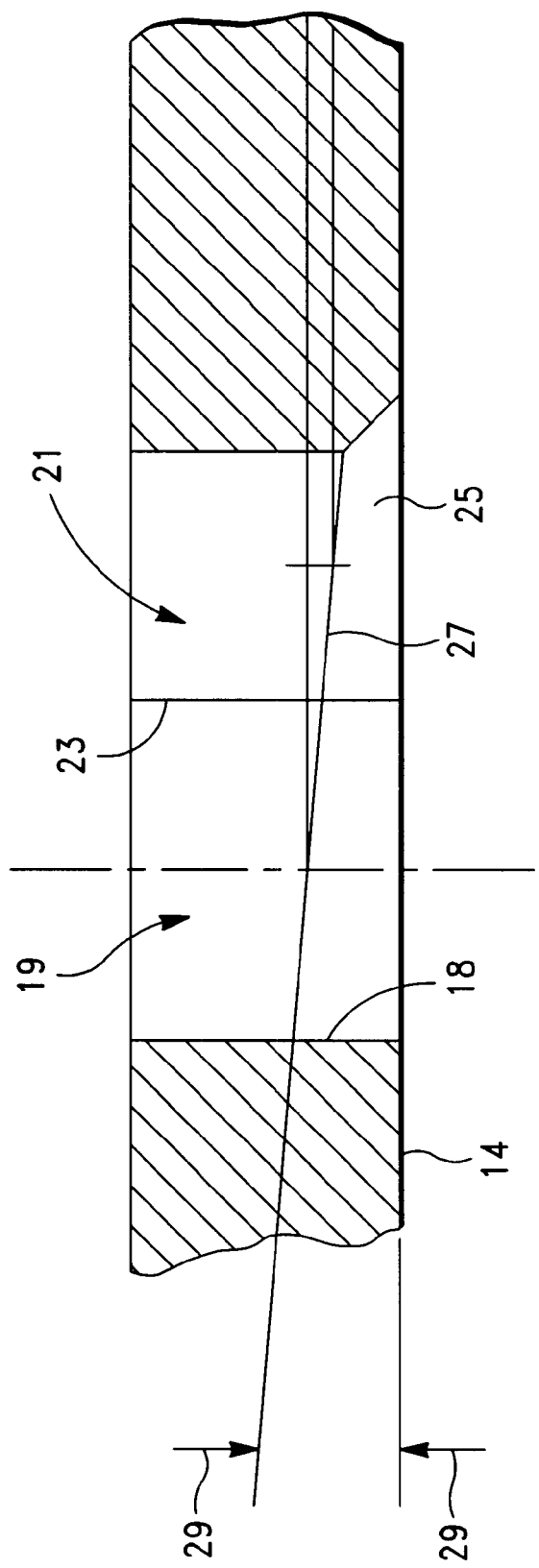
FIG. 1C is a longitudinal section view of the actuator housing

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention.

Referring to FIG. 1A, the improved gate valve 10 of the present invention includes a gate valve mechanism (not shown) that is substantially the same as that disclosed in my U.S. Pat. No. 5,884,899, entitled "Half Profile Gate Valve." Gate valve 10 is provided with a slide lock mechanism 12 that is similar to that disclosed in my U.S. Pat. No. 5,791,632 entitled "Quick Release Slide Lock for Vacuum Valve" in that it includes a pair of slide lock plates 14 (only one shown) one on each side of the gate valve. Slide lock plates 14 are movable in the direction of arrows 16 and function to lock and release an actuator assembly 30 with respect to valve housing 50.

Slide lock plates 14 each include a set of four longitudinally spaced slots 18 that receive downwardly extending guide screws 20 from the housing of actuator assembly 30 that function as discussed in my '632 patent. Slide lock plates 14 also include a pair of slots 22 that each receive a shoulder screw 24, and this design is also disclosed in my '632 patent.

FIGS. 1B and 1C show the design of openings 18 in one of the slide lock plates 14. Each opening 18 is generally oblong circular in shape and includes a wide diameter half 19 and a neck down small diameter half 21. The wide diameter half 19 is wide enough to pass the head of a guide screw 20 therethrough, while the neck down region is not. In FIG. 1C, the line delineating the wide and small diameter regions is denoted by reference 23.

Opening 18 also includes a beveled region 25, which consists of a bevel cut that has a progressively diminishing depth so as to form a ramp or cam surface 27. During clamping, the head of a guide screw engages cam surface 27 and is pulled thereby as a slide lock plate is slid longitudinally, in order to clamp the bonnet plate down onto the valve body flange. The slope of cam surface 27, depicted by arrows 29, is approximately 5 degrees, which creates sufficient difference in depth of bevel region 25 to clamp the bonnet plate onto the valve body flange. When the gate valve is operational, the vacuum pressure within the valve housing augments the clamping force of the slide lock plates, which together create an adequate seal at the bonnet plate.

The design of actuator assembly 30 is similar to that disclosed in my '899 patent. The upper end of gate valve 10 has been modified to include an enclosure formed by a top plate 32, an end wall 34, and side walls (not shown). Top plate 32 provides a mount for a release drive shaft pinion 36, the upper end of which extends above top plate 32 and outwardly beyond actuator 30 and includes a drive coupling in the form of a hex socket 38 for receiving a wrench for manual turning of shaft 36.

An upright tubular collar support 40 is secured to the bonnet 42 of gate valve 10 and includes an inner bushing sleeve 44. Drive shaft pinion 36 extends down through aligned openings in bonnet 42 and the upper flange 46 of valve housing 50 and into a machined recess slot 48 of slide lock plate 14. The design and operation of shaft 36 and recess 48 are discussed with reference to FIGS. 2 and 3.

Referring to FIG. 1B, with slide lock plate 14 moved to the right, as shown by arrow 16 (along with movement of the other slide lock plate), actuator assembly 30 is able to be lifted from the valve housing 50, and this is also discussed in my '632 patent.

The bottom end of release shaft 36 is splined to interengage with the teeth of a rack 52 mounted to plate 14 within recess 48. The splines of shaft 36 are freely released from the teeth of rack 52 upon lifting of actuator assembly 30, as are guide screws 20 from slots 1B.

FIG. 2 shows both release shafts 36 and slide lock plates 14 with the pinion ends of shafts 36 engaging racks 52. Rotation of both release shafts by a maintenance technician causes sliding movement of both slide lock plates, freeing their guide screw heads from the slots of the slide lock plates.

FIG. 3 is a top view of the slide lock plates 14 and the release mechanism of shafts 36 and racks 52. Each release shaft 36 extends down into its respective recess 48 on the inside of a rack 52, which are secured at the outer sides of recesses 48. Rotation of release shafts 36 causes linear movement of slide lock plates 14 in the direction of arrows 16, which either release guide screws 20 from or engages guide screws 20 with their respective slots 18, to release or lock the actuator assembly.

Provision of a quick release mechanism accessible from above the gate valve has the advantage of allowing easy access to the gate valve for maintenance purposes. Typically, gate valves are sandwiched between modules of applied processing systems and for this reason have to be fully removed for maintenance and repair. The present invention for removal of only the actuator, leaving the valve mechanism and/or housing in place.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto when read and interpreted according to accepted legal principles such as the doctrine of equivalents and reversal of parts.

What is claimed is:

1. A vacuum valve for controlling vacuum media flow, comprising, a valve housing defining a valve chamber and adapted to receive a movable valve plate within the valve chamber to prevent vacuum media flow, the valve housing including a removable end plate to which a valve plate actuator is secured, the valve plate actuator adapted to move the valve plate within the valve chamber, so that removal of the end plate in an upward direction separates the valve plate actuator, the valve housing also including an end plate engaging member, a clamp mechanism coupled to one of the end plate or end plate engaging member, the clamp mechanism having a first position allowing separation of the end plate from the end plate engaging member and a second position that securely holds the end plate to the end plate engaging member in a sealed manner, and a clamp actuator extending through the end plate-from above and connected to the clamp mechanism for moving the clamp mechanism between its first position and its second position.

2. The vacuum valve of claim 1, wherein, the clamp mechanism is movable between its first and second positions in a direction transverse the direction of removal of the end plate.

3. The vacuum valve of claim 2 wherein, the clamp actuator includes a pinion component and the clamp mechanism includes a rack component coupled to the pinion component, whereby rotation of the pinion component causes linear movement of the rack component, causing the clamp mechanism to move between its first and second positions.

4. The vacuum valve of claim 3 wherein, the clamp actuator includes an elongated drive shaft connected to the pinion component, the elongated drive shaft extending away from the end plate beyond an outer end of the valve plate actuator.

5. The vacuum valve of claim 4 wherein, the drive shaft includes an outer end that has a drive coupling for manual rotation of the drive shaft and connected pinion component.

6. The vacuum valve of claim 3 wherein, the clamp mechanism includes a series of guide screws mounted to one of the end plate or the end plate engaging member and extending through openings in the other of said end plate and end plate engaging member, and a slide plate that is movable in a plane transverse to the guide screws, the slide plate having a first position that permits separation of the end plate from the end plate engaging member and a second position that securely fastens the end plate to the end plate engaging member.

7. The vacuum valve of claim 6 wherein, the slide plate includes elongated openings, one for each guide screw, and a guide screw engaging protrusion, and at least one guide screw includes a shoulder adapted to engage a guide screw engaging protrusion when the slide plate is in a second position and thereby prevent movement of the guide screw in a direction along its central axis.

8. The vacuum valve of claim 7 wherein, the guide screw engaging protrusion includes a cam surface for progressively engaging the shoulder of the guide screw and clamping the end plate and end plate engaging member together.

9. The vacuum valve of claim 3 wherein, a pair of rack components are provided, one on each side of the valve housing, a pair of pinion components are provided, one for driving each rack component.

10. The vacuum valve of claim 9 wherein, both pinion components extend outwardly beyond the valve actuator.

11. A vacuum valve for controlling vacuum media flow, comprising, a valve housing defining a valve chamber, said valve housing being dimensioned and configured to receive a movable valve plate within the valve chamber to prevent vacuum media flow, the valve housing also including an end plate engaging member;

the valve housing including a removable end plate to which a valve plate actuator is secured, the valve plate actuator dimensioned and configured to move the valve plate within the valve chamber, so that removal of the end plate in an upward direction separates the valve plate actuator from the end plate engaging member, a clamp mechanism coupled to the end plate engaging member, the clamp mechanism having a first position allowing separation of the end plate from the end plate engaging member and a second position that securely holds the end plate to the end plate engaging member in a sealed manner, and a clamp actuator extending through the end plate from above and connected to the clamp mechanism for causing linear movement of the clamp mechanism between its first position and its second position.

12. The vacuum valve of claim 11 wherein, the clamp actuator includes an elongated drive shaft connected to a pinion component, the elongated drive shaft extending away from the end plate beyond an outer end of the valve plate actuator.

13. The vacuum valve of claim 12 wherein, the drive shaft includes an outer end that has a drive coupling for manual rotation of the drive shaft and connected pinion component.

14. The vacuum valve of claim 14 wherein, the clamp mechanism includes a guide screw mounted to the end plate and extending through an opening in the end plate engaging member, and a slide plate that is movable in a plane transverse to the guide screw, the slide plate having a first position that permits separation of the end plate from the end plate engaging member and a second position that securely fastens the end plate to the end plate engaging member.

15. The vacuum valve of claim 14 wherein, the slide plate includes an elongated opening, and a guide screw engaging protrusion, and the guide screw includes a shoulder adapted to engage a guide screw engaging protrusion when the slide plate is in a second position and thereby prevent movement of the guide screw in a direction along its central axis.

16. The vacuum valve of claim 15 wherein, the guide screw engaging protrusion includes a cam surface for progressively engaging the shoulder of the guide screw and clamping the end plate and end plate engaging member together.

17. The vacuum valve of claim 11 wherein, a pair of rack components are provided, one on each side of the valve housing, a pair of pinion components are provided, one for driving each rack component.

18. The vacuum valve of claim 17 wherein, both pinion components extend outwardly beyond the valve actuator.

19. A vacuum valve for controlling vacuum media flow, comprising, a valve housing defining a valve chamber and including an upper flange, said upper flange having a screw aperture;

an actuator assembly dimensioned and configured to move a valve plate within said valve chamber, said actuator assembly including a bonnet removably engageable with said upper flange so that removal of said bonnet separates said actuator assembly from said valve housing, a slide lock mechanism including a guide screw mounted to said bonnet and extending through said screw aperture, said slide lock mechanism further including a slide plate engageable with said guide screw, said slide plate being movable in a plane transverse to said guide screw between a first position in which said slide plate is disengaged with said guide screw allowing separation of said bonnet from said upper flange and a second position in which said slide plate is engaged with said guide screw thereby securely fastening said bonnet to said upper flange, a release drive shaft extending through said actuator assembly and connected to said slide lock mechanism for moving said slide plate between said first and second positions, whereby rotation of the said release drive shaft causes transverse movement of said slide plate between said first and second positions.

* * * * *